US011342780B1

(12) United States Patent
Brown

(10) Patent No.: US 11,342,780 B1
(45) Date of Patent: May 24, 2022

(54) PORTABLE HYBRID GENERATOR

(71) Applicant: Audley Brown, Miami, FL (US)

(72) Inventor: Audley Brown, Miami, FL (US)

( * ) Notice: Subject to any disclaimer, the term of this patent is extended or adjusted under 35 U.S.C. 154(b) by 230 days.

(21) Appl. No.: 16/728,624

(22) Filed: Dec. 27, 2019

(51) Int. Cl.
*H02J 7/00* (2006.01)
*H02J 7/14* (2006.01)
*H02J 7/35* (2006.01)

(52) U.S. Cl.
CPC .......... *H02J 7/1415* (2013.01); *H02J 7/0044* (2013.01); *H02J 7/35* (2013.01)

(58) Field of Classification Search
CPC .................................................... H02J 7/1415
USPC ......................................................... 320/107
See application file for complete search history.

(56) References Cited

U.S. PATENT DOCUMENTS

| 6,943,531 | B2 * | 9/2005 | Fukaya | F02D 29/06 |
| | | | | 322/10 |
| 7,105,940 | B2 | 12/2006 | Weesner | |
| 7,876,065 | B2 | 1/2011 | Grant | |
| 8,076,900 | B1 * | 12/2011 | Brown | F02N 11/14 |
| | | | | 320/105 |
| 8,723,345 | B2 | 5/2014 | Choi | |
| 8,759,714 | B2 | 6/2014 | Fosbinder | |
| 9,166,422 | B2 | 10/2015 | Brotto et al. | |
| 9,705,357 | B2 | 7/2017 | Apalenek | |
| 2009/0284216 | A1 * | 11/2009 | Bessa | H02J 7/0044 |
| | | | | 320/101 |
| 2011/0133481 | A1 | 6/2011 | Mullins | |
| 2015/0200564 | A1 * | 7/2015 | Apalenek | H02J 4/00 |
| | | | | 290/40 B |
| 2018/0170291 | A1 | 6/2018 | Gorji | |
| 2019/0207416 | A1 | 7/2019 | Ellis | |

FOREIGN PATENT DOCUMENTS

| CA | 2610507 A1 | 5/2008 |
| CA | 2882780 A1 | 5/2015 |
| GB | 2493631 A | 9/2012 |

* cited by examiner

*Primary Examiner* — Yalkew Fantu
(74) *Attorney, Agent, or Firm* — Albert Bordas, P.A.

(57) ABSTRACT

A portable hybrid generator having a frame assembly with a battery-mounting base, a gas power charger assembly secured within the frame assembly, and an electric charger assembly mounted onto the battery-mounting base. The frame assembly has a front wall, frames, lateral walls, a rear wall, a top edge, a dividing wall, and a cover. The lateral walls extend from the battery-mounting base to the top edge and have battery connection points. The frame assembly further has wheels, a stopper, and a handle. The front wall has a transfer switch, a motor on/off switch, and at least one frame outlet. The gas power charger assembly has a gas motor, an alternator, a gas tank, and a solenoid. The electric charger assembly has first and second portable battery assemblies.

10 Claims, 3 Drawing Sheets

PORTABLE HYBRID GENERATOR

BACKGROUND OF THE INVENTION

1. Field of the Invention

The present invention relates to charging systems, and more particularly, to portable hybrid generator charging systems.

2. Description of the Related Art

Applicant believes that one of the closest references corresponds to U.S. Pat. No. 8,076,900 B1 issued to Applicant's own Audley Brown on Dec. 13, 2011 for Portable battery charger. However, it differs from the present invention because Brown teaches a portable battery charger, comprising a base assembly housing a first electrical system. The first electrical system comprises a first rechargeable battery with a respective first booster cable port. The first booster cable port has first receiving means to receive removable booster cables. The first electrical system has first recharging means to recharge the first rechargeable battery. The base assembly also houses an air compressor system. The air compressor system comprises an air compressor having means to deliver compressed air through a hose to a valve stem fitting. A head assembly houses a second electrical system. The second electrical system comprises a second rechargeable battery with a respective second booster cable port. The second booster cable port has second receiving means to receive the removable booster cables. The second electrical system has second recharging means to recharge the second rechargeable battery. The head assembly removably mounts onto the base assembly.

Applicant believes that another reference corresponds to U.S. Pat. No. 7,105,940 B2 issued to Brent Edward Weesner on Dec. 9, 2006 for Mobile renewable energy generator. However, it differs from the present invention because Weesner teaches a method and apparatus for a portable renewable energy generator that includes a movable platform adapted for one of towing and transport to a remote area, a redundant renewable energy source generator including a wind energy extraction device configured for transport on the movable platform, and a battery system operably connected to the redundant renewable energy source generator. The battery system is configured to store electrical energy generated by the redundant renewable energy source generator.

Applicant believes that another reference corresponds to U.S. Pat. No. 7,876,065 B2 issued to Earl Grant on Jan. 25, 2011 for Method for extending the time a portable generator powered by a DC battery may operate by recharging the battery at the same time it is being used as a power source. However, it differs from the present invention because Grant teaches a method for extending the time a battery-operated electrical generator that may operate by recharging the battery, at the same time it is being used as a power source, by using a portion of the electrical output to operate an alternator to produce low current and low voltage electrical power to recharge the battery, while supplementing from another source, including solar or wind, the power used to operate the alternator.

Applicant believes that another reference corresponds to U.S. Pat. No. 8,723,345 B2 issued to Choi Byung-Youl on May 13, 2014 for Portable generator and generating method. However, it differs from the present invention because Byung-Youl teaches a portable generator that comprises a fluid pressure generator, a fluid pressure cylinder, a gas power generator, a gas generator, and a charger. The fluid pressure generator is for generating a fluid pressure by pumping, and the fluid pressure generator includes an airbag for compensating a volume change by the pressurized moving of the non-compressible fluid. The fluid pressure cylinder is connected to the fluid pressure generator and comprising a fluid pressure piston, a gas piston, and a piston rod connecting the fluid pressure piston and the gas piston. The gas power generator comprises a high-pressure gas chamber, the piston rod, the gas piston of the fluid pressure cylinder, and a cycle path. The gas generator is for generating electricity with a flow of the high-pressure gas moving in the high-pressure gas chamber as a power source.

Applicant believes that another reference corresponds to U.S. Pat. No. 8,759,714 B2 issued to Daniel C. Fosbinder on Jun. 24, 2014 for Portable generator and battery charger verification control method and system. However, it differs from the present invention because Fosbinder teaches a system that may include a portable welding unit having an engine, a generator coupled to the engine, a compressor coupled to the engine, and a smart battery charger coupled to the generator. The smart battery charger may be configured to monitor a temperature of a battery, an ambient temperature, a battery charge time, or a combination thereof. The smart battery charger may also be configured to adjust an output based on a battery type, a battery voltage rating, a sensed feedback, a battery test, or a combination thereof.

Applicant believes that another reference corresponds to U.S. Pat. No. 9,166,422 B2 issued to Brotto, et al. on Oct. 20, 2015 for Battery based portable power supply. However, it differs from the present invention because Brotto, et al. teach a portable power supply that includes a housing, and power circuitry providing an output AC waveform having a first positive voltage step level, a second higher positive voltage step level, a third lower positive voltage step level, a fourth negative voltage step level, a fifth higher negative voltage step level, and a sixth lower negative voltage step level.

Applicant believes that another reference corresponds to U.S. Pat. No. 9,705,357 B2 issued to Thomas Apalenek on Jul. 11, 2017 for Hybrid electric generator set. However, it differs from the present invention because Apalenek teaches a portable generator system that provides power to a load source including an engine and a generator. The engine drives the generator to provide a generator alternating current (AC) electrical power output. An energy storage system (ESS) provides an ESS direct current (DC) electrical power output. A first inverter is connected to the generator for receiving the generator AC electrical power output and for providing a DC power output. A second inverter is connected to the first inverter and the ESS for receiving the DC power output from the first inverter and the ESS DC electrical power output for providing an AC power output. A first power mode includes the generator maintaining a first generator power output level corresponding to a specified power requirement of a load source, and the ESS providing an additional first ESS power output level for satisfying the specified power requirement of the load source.

Applicant believes that another reference corresponds to U.S. Patent Application Publication No. 2011/0133481 A1, published on Jun. 9, 2011 to Raymond Mullins for Ecologically friendly generator. However, it differs from the present invention because Mullins teaches a generator comprising a combustion chamber for combusting fuel to produce a high pressure flow of air or gas, a combustion wheel comprising a rim with circumferentially spaced combustion plates protruding radially outward from the rim for receiving the high pressure flow of air or gas, a wheel hub providing means for rotating the wheel on an axis of rotation upon interaction of the high pressure flow on the combustion plates, spokes comprising one or more magnets, wherein the spokes operably connect the hub to the rim and provide for the magnets to interact with pick-up coils, pick-up coils for receiving energy from the magnets during rotation of the wheel and for producing electrical energy therefrom, and optionally a battery for receiving and storing energy from the pick-up coils.

Applicant believes that another reference corresponds to U.S. Patent Application Publication No. 2018/0170291 A1, published on Jun. 21, 2018 to Jubin Gorji for Portable and cost-efficient transportation system with an integrated electric generator. However, it differs from the present invention because Gorji teaches a portable and cost-efficient transportation system with an integrated electric generator, capable of transporting various objects, while producing an electric current and sufficient quantities of electricity through the simultaneously created rotation of the device's wheels. The harvested electrical energy can then be stored in an integrated battery and utilized directly via an integrated power AC outlet socket, USB port and/or integrated lighting mechanism. The portable device encompasses collapsible features, such as a collapsible handle and base, for simplified transportation and employs efficient generators to generate a steady flow of electricity during usage of the device.

Applicant believes that another reference corresponds to U.S. Patent Application Publication No. 2019/0207416 A1, published on Jul. 4, 2019 to Raymond Ellis for Portable power supply. However, it differs from the present invention because Ellis teaches a mobile power supply unit that includes a base and a housing including at least one housing member secured to the base and movable relative to the base. The mobile power supply unit further includes a generator disposed within the housing, and a battery disposed within the housing. The mobile power supply unit further includes an inverter electrically connected to the generator and the battery, and an electronics enclosure including an electrical port, and a transfer switch electrically connected to the inverter and adapted to provide power through the electrical port. The mobile power supply unit further includes a portable transfer switch having a first electrical cable selectively electrically connectable to the electrical port and a second electrical cable selectively electrically connectable with a power receptacle of a building.

Applicant believes that another reference corresponds to CA Patent No. 2,610,507 A1 issued to Stefan Stan on May 17, 2008 for Hybrid electric generator set. However, it differs from the present invention because Stan teaches a mobile power generator for use in remote areas, comprising a wind turbine, photovoltaic solar cell panels, an internal combustion engine motor generator, a rechargeable battery operatively connected to the wind turbine, solar cell panels and motor generator, and a digital console having a CPU operatively connected to the wind turbine, solar cell panels, motor generator, and battery whereby independent monitoring and operational synchronization thereof is achieved for optimizing wind and sun energy collection. The control console includes an electrical supply, for continuous independent delivery of electrical current from each wind turbine, solar cell panel, generator and battery, to external equipment, and the CPU including a power management algorithm routine, enabling prioritization of electrical supply to the battery selectively from at least one of the turbine, solar panel and motor generator, in accordance with relative energy supply therefrom and with remaining electrical charge at the level of the battery.

Applicant believes that another reference corresponds to CA Patent No. 2,882,780 A1 issued to Dominic Di Stefano on May 11, 2015 for Battery operated power generator. However, it differs from the present invention because Di Stefano teaches a battery operated power generator using two separate operating battery bank sources. One of which is used to drive an electric motor to turn a generator, which is supplying power to a battery charging system, while the second operating battery is regenerating. The charging system also charges one of two separate storage battery banks, while the second battery bank is supplying a load. When either the operating battery or the storage battery is depleted, they are switched to charge and the regenerated batteries drive the motor or supply the load to the distribution panel. All the functions of this generator are controlled through a programmable logic controller.

Applicant believes that another reference corresponds to GB Patent No. 2,493,631 A issued to Thomas Apalenek on Sep. 26, 2012 for Hybrid electric generator set. However, it differs from the present invention because Apalenek teaches a portable generator system and method of use that comprises an engine, a generator driven by the engine to produce AC power, an energy storage system (ESS) which may be a lithium ion battery or lead acid battery or ultra-capacitor, a first inverter or rectifier to convert the AC to DC, and a second inverter to convert the DC outputs of the ESS and the rectifier to AC. In a first mode of operation the generator produces a first power output according to load requirements, which is supplemented by a power output of the ESS. In an optional second mode, the engine may turn off at a specified power output or revolution frequency (RPM) in order to optimize fuel efficiency, the load then being powered only by the ESS, with the engine restarting when the ESS is discharged. A further portable generator system operates within its optimum performance range providing AC to a load, comprising an ESS and an inverter to convert the ESS output from DC to AC to supplement the generator output.

Other patents describing the closest subject matter provide for a number of more or less complicated features that fail to solve the problem in an efficient and economical way. None of these patents suggest the novel features of the present invention.

SUMMARY OF THE INVENTION

The present invention is a portable hybrid generator comprising a frame assembly having a battery-mounting base, a gas power charger assembly secured within the frame assembly, and an electric charger assembly mounted onto the battery-mounting base.

The frame assembly comprises a front wall, frames, lateral walls, a rear wall, a top edge, a dividing wall, and a cover. The lateral walls extend from the battery-mounting base to the top edge and comprise battery connection points. The frame assembly further comprises wheels, a stopper, and a handle. The front wall comprises a transfer switch, a motor on/off switch, and at least one frame outlet.

The gas power charger assembly comprises a gas motor, an alternator, a gas tank, and a solenoid.

The electric charger assembly comprises first and second portable battery assemblies. The first and second portable battery assemblies are removable. The first and second portable battery assemblies each comprise a handle and battery connectors respectively. The first and second portable battery assemblies each comprises a switch, at least one outlet, a cigarette lighter socket, and at least one universal serial bus port. The first and second portable battery assemblies each further comprise a solar panel accessory outlet. The first and second portable battery assemblies each further comprise a pop out light, a battery power indicator, a control unit, and an electrical plug. The electric charger assembly further comprises battery-charging cables that are removable. The first and second portable battery assemblies mount onto the battery-mounting base together or independently of one another. The first and second portable battery assemblies mount onto the battery-mounting base, causing the battery connectors to contact respective the battery connection points. The first and second portable battery assemblies comprise battery banks. The first and second portable battery assemblies are used together or independently. The first and second portable battery assemblies are charged by the solar panel, by the gas power charger assembly, and the electrical plug. The first and second portable battery assemblies power the gas power charger assembly.

It is therefore one of the main objects of the present invention to provide a portable hybrid generator.

It is another object of this invention to provide a portable hybrid generator that has a gas power charger and an electric power charger.

It is another object of this invention to provide a portable hybrid generator having two portable battery assemblies.

It is another object of this invention to provide a portable hybrid generator having two portable batteries that can be used either at one time or at separated times.

It is another object of this invention to provide a portable hybrid generator that is volumetrically efficient for carrying, transporting, and storage.

It is another object of this invention to provide a portable hybrid generator, which is of a durable and reliable construction.

It is yet another object of this invention to provide a portable hybrid generator that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
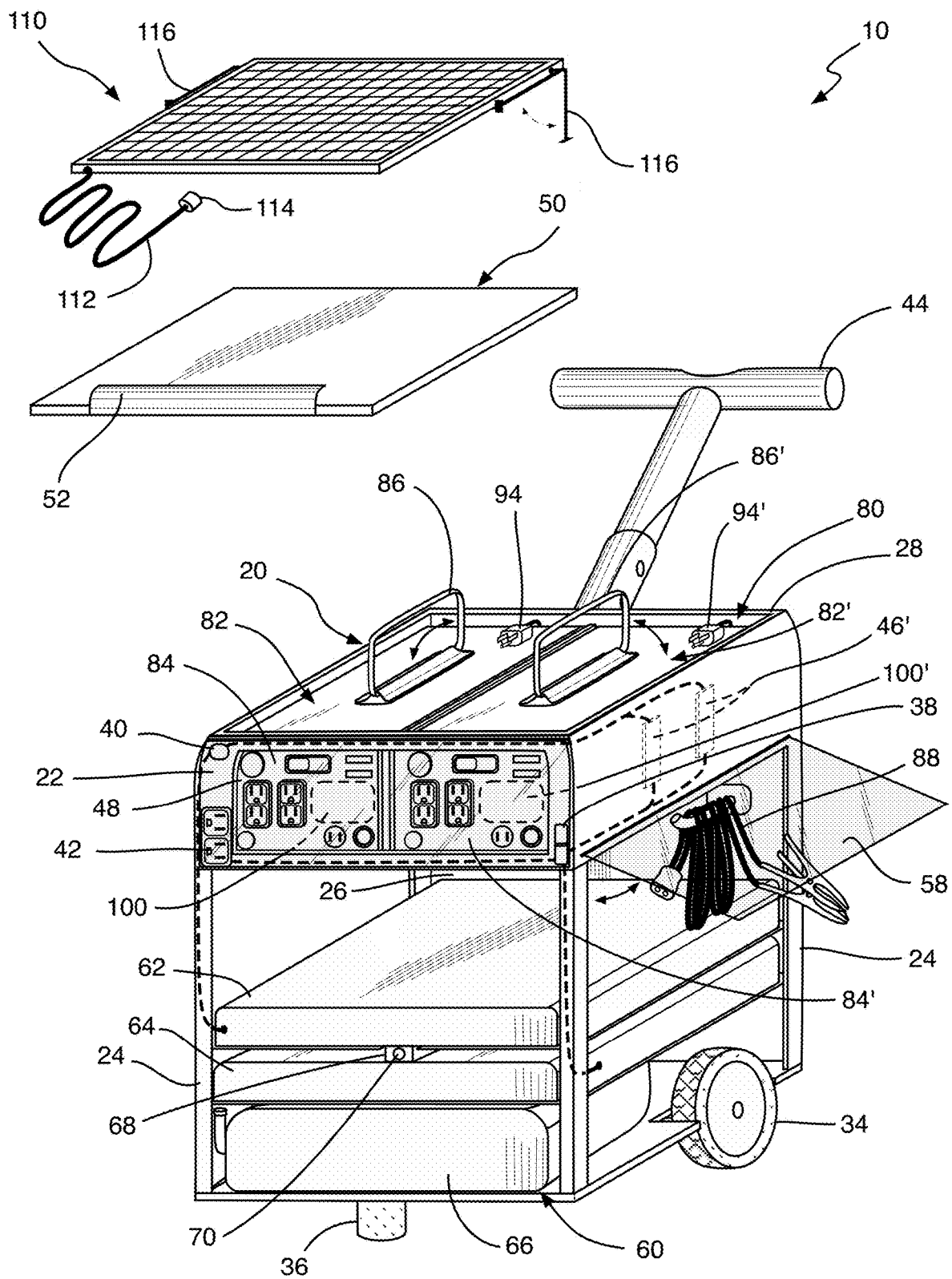
FIG. 1 is an isometric view of the present invention including a cover and a solar panel.

Referring now to the drawings, the present invention is a portable hybrid generator, and is generally referred to with numeral 10. It can be observed that it basically includes frame assembly 20, gas power charger assembly 60, electric charger assembly 80, and solar panel 110.

As seen in FIG. 1, electric charger assembly 80 is mounted onto frame assembly 20, and gas power charger assembly 60 is placed within frame assembly 20. Electric charger assembly 80 comprises first and second portable battery assemblies 82 and 82' having front faces 84 and 84' respectively.

Frame assembly 20 comprises front wall 22, frames 24, rear wall 26, and top edge 28. Frame assembly 20 further comprises wheels 34, stopper 36, and handle 44. In a preferred embodiment, handle 44 is telescopic. Frame assembly 20 further comprises cover 50 having lip 52. Front wall 22 has opened sections, whereby front faces 84 and 84' are visible when respective first and second portable battery assemblies 82 and 82' are placed within frame assembly 20.

First and second portable battery assemblies 82 and 82' comprise rechargeable battery banks, and are used together or one at a time.

Front wall 22 comprises transfer switch 38, motor on/off switch 40, and at least one frame outlet 42. Motor on/off switch 40 is used to switch gas motor 62 to operate using gas from gas tank 66 or electricity from electric charger assembly 88. Gas power charger assembly 60 comprises gas motor 62, alternator 64, gas tank 66, and solenoid 68. Solenoid 68 comprises solenoid switch 70. Activating solenoid 68 with solenoid switch 70 starts gas motor 62. Alternator 64 is connected to transfer switch 38, frame outlets 42, and battery connection points 46 and 46'. In a preferred embodiment, frame assembly 20 further comprises front cover 48 and lateral cover 58 to protect electrical components from the weather. In a preferred embodiment, front cover 48 and lateral cover 58 are transparent.

Solar panel 110 comprises cord 112, plug 114, and legs 116. Legs 116 allow positioning solar panel 110 with a predetermined angle according to the sun's position.

Figure 2:
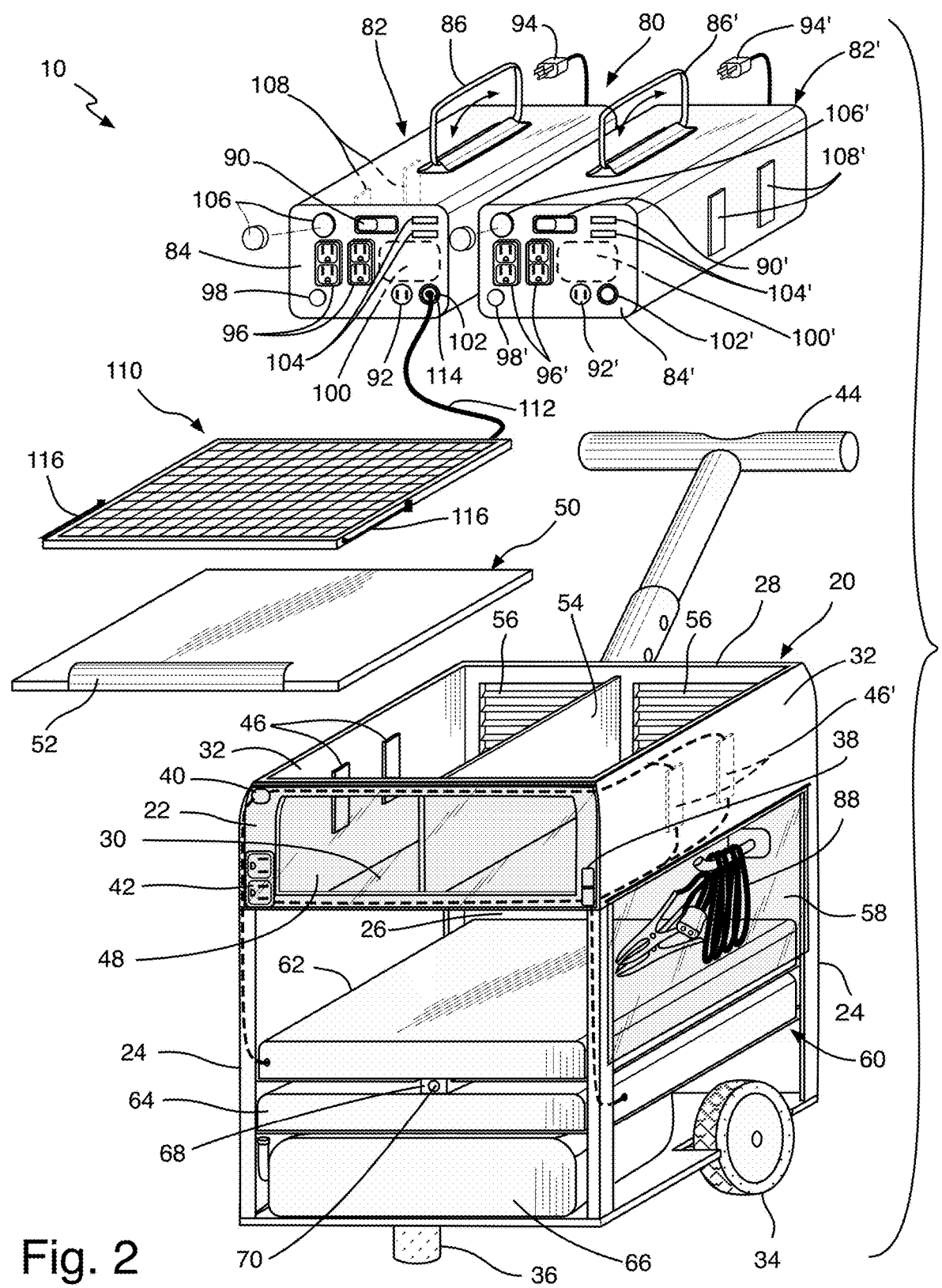
FIG. 2 is an isometric view of the present invention with an electric charger assembly removed from a frame assembly and the cover and solar panel.

As seen in FIG. 2, frame assembly 20 comprises battery-mounting base 30. Electric charger assembly 80 is mounted onto battery-mounting base 30. Frame assembly 20 further comprises lateral walls 32 and dividing wall 54. Lateral walls 32 extend from battery-mounting base 30 to top edge 28, and comprise battery connection points 46 and 46'. Dividing wall 54 separates first and second portable battery assemblies 82 and 82'. In a preferred embodiment, rear wall 26 comprises vents 56. First and second portable battery assemblies 82 and 82' are removable, and comprise handles 86 and 86' respectively. First portable battery assembly 82 comprises switch 90, battery power indicator 92, at least one outlet 96, cigarette lighter socket 98, and solar panel accessory outlet 102. First portable battery assembly 82 further comprises at least one universal serial bus port 104 and pop out light 106. Pop out light 106 is removable and may comprise small batteries or a capacitor(s).

In a preferred embodiment, second portable battery assembly 82' is structurally similar to first portable battery assembly 82. Therefore, second portable battery assembly 82' comprises switch 90', battery power indicator 92', at least one outlet 96', cigarette lighter socket 98', and solar panel accessory outlet 102'. Second portable battery assembly 82' further comprises at least one universal serial bus port 104' and pop out light 106'. Pop out light 106' is removable and may comprise small batteries or a capacitor(s).

Solar panel 110 charges first and second portable battery assemblies 82 and 82' when plug 114 is inserted into solar panel accessory outlet 102 or 102' respectfully. First and second portable battery assemblies 82 and 82' further comprise battery connectors 108 and 108' respectively. First and second portable battery assemblies 82 and 82' mount onto battery-mounting base 30, causing connectors 108 and 108' to contact respective battery connection points 46 and 46'. Electric charger assembly 80 further comprises removable battery charging cables 88. First and second portable battery assemblies 82 and 82' further comprise electrical plugs 94 and 94' respectively.

Figure 3:
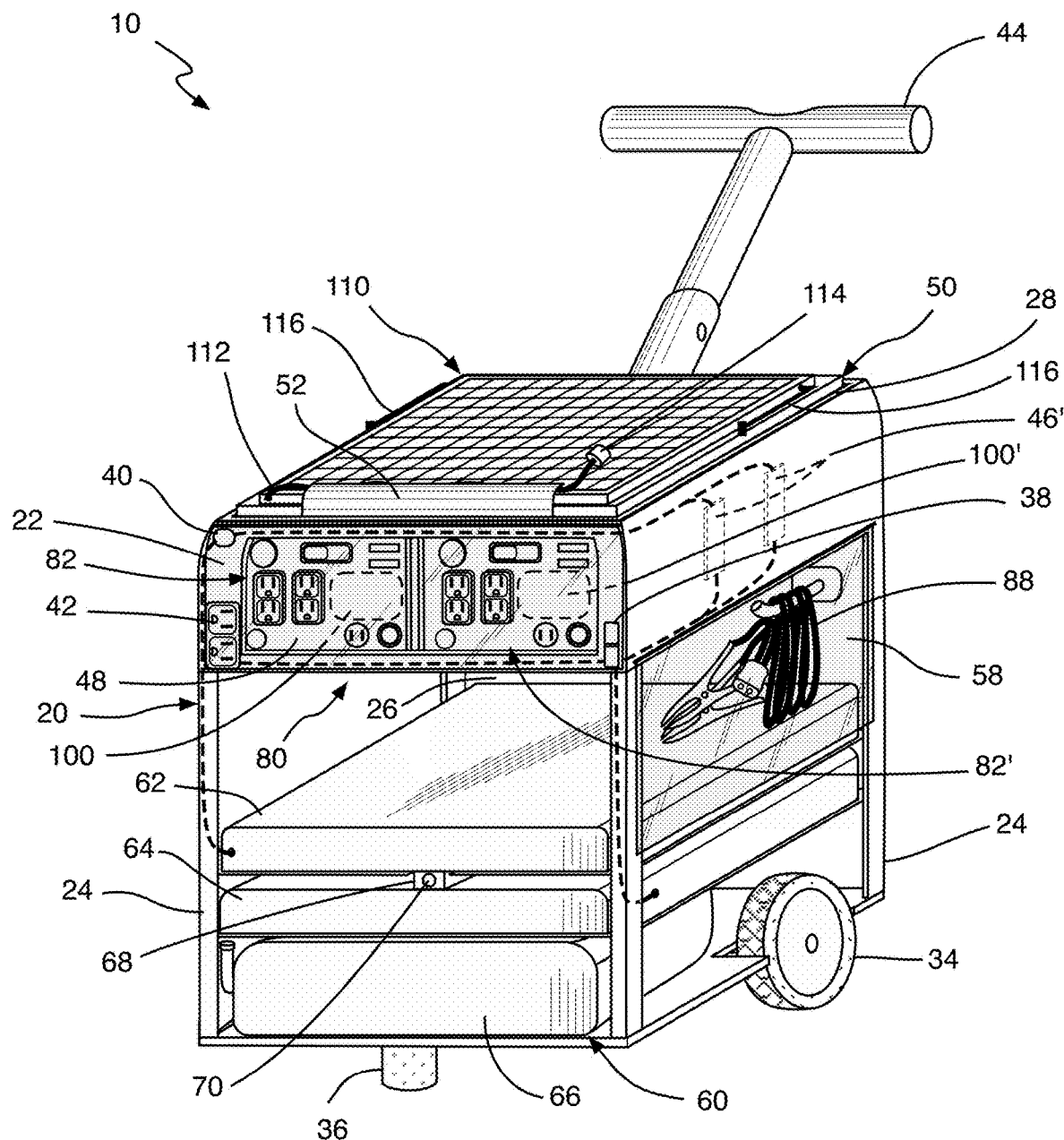
FIG. 3 is an isometric view of the present invention.

As seen in FIG. 3, solar panel 110 is mounted onto cover 50, and is secured by lip 52. First and second portable battery assemblies 82 and 82' may be recharged through solar panel 110, gas power charger assembly 60, and/or respective electrical plugs 94 and 94', as seen in FIG. 2. In addition, first and second portable battery assemblies 82 and 82' are used to power gas power charger assembly 60. First and second portable battery assemblies 82 and 82' comprise rechargeable battery banks, and are used together or one at a time. The benefit of utilizing one of portable battery assemblies 82 or 82' at a time, is that a depleted/nearly depleted portable battery assembly 82 or 82' may be recharged, while the other portable battery assembly 82 or 82' is in use. Therefore, either of portable battery assemblies 82 and 82' can be used while the other is recharging. First and second portable battery assemblies 82 and 82' further comprise control units 100 and 100' respectively. Control units 100 and 100' may comprise a wireless networking protocol that allows devices to communicate without direct cable connections such as "WIFI". Present invention 10 further provides over charge protection and shutdown when low discharge is approaching.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable hybrid generator comprising:
   A) a frame assembly having a battery-mounting base, said frame assembly comprises a front wall, frames, lateral walls, a rear wall, a top edge, a dividing wall, a cover, wheels, a stopper, and a handle, said lateral walls extend from said battery-mounting base to said top edge and comprise battery connection points;
   B) a gas power charger assembly secured within said frame assembly;
   C) an electric charger assembly mounted onto said battery-mounting base, said electric charger assembly comprises first and second portable battery assemblies that are removable from said battery-mounting base, said first and second portable battery assemblies each comprise a handle and battery connectors respectively, said first and second portable battery assemblies mount onto said battery-mounting base together or independently of one another, said first and second portable battery assemblies mount onto said battery-mounting base, causing said battery connectors to contact respective said battery connection points; and
   D) a solar panel, wherein said first and second portable battery assemblies each further comprise a solar panel accessory outlet; and further characterized in that said first and second portable battery assemblies are charged by said solar panel, by said gas power charger assembly, and said electrical plug.

2. The portable hybrid generator set forth in claim 1, further characterized in that said front wall comprises a transfer switch, a motor on/off switch, and at least one frame outlet.

3. The portable hybrid generator set forth in claim 1, further characterized in that said gas power charger assembly comprises a gas motor, an alternator, a gas tank, and a solenoid.

4. The portable hybrid generator set forth in claim 1, further characterized in that said first and second portable battery assemblies each comprises a switch, at least one outlet, a cigarette lighter socket, and at least one universal serial bus port.

5. The portable hybrid generator set forth in claim 1, further characterized in that said first and second portable battery assemblies each further comprise a pop out light, a battery power indicator, a control unit, and an electrical plug.

6. The portable hybrid generator set forth in claim 1, further characterized in that said electric charger assembly further comprises battery-charging cables.

7. The portable hybrid generator set forth in claim 6, further characterized in that said battery-charging cables are removable.

8. The portable hybrid generator set forth in claim 1, further characterized in that said first and second portable battery assemblies comprise battery banks.

9. The portable hybrid generator set forth in claim 1, further characterized in that said first and second portable battery assemblies are used together or independently.

10. The portable hybrid generator set forth in claim 1, further characterized in that said first and second portable battery assemblies power said gas power charger assembly.

* * * * *